United States Patent [19]

Baker et al.

[11] Patent Number: 4,533,096
[45] Date of Patent: Aug. 6, 1985

[54] HIGH LIFT SYSTEM CONTROL ASSEMBLY

[75] Inventors: Michael E. Baker, Kent; Thomas M. Baker, Renton, both of Wash.

[73] Assignee: The Boeing Company, Seattle, Wash.

[21] Appl. No.: 454,559

[22] Filed: Dec. 30, 1982

[51] Int. Cl.³ ................... B64C 13/32; B64C 13/38
[52] U.S. Cl. ................... 244/75 R; 244/213; 244/221; 244/233; 74/471 R; 74/480 R; 74/568 R; 91/382
[58] Field of Search ............ 244/213, 215, 214, 75 R, 244/76 R, 78, 220, 221, 223, 211, 225, 226, 232; 91/382; 74/471 R, 491, 533, 567, 534, 568, 479; 192/139, 142 R

[56] References Cited

U.S. PATENT DOCUMENTS

| | | | |
|---|---|---|---|
| 2,601,760 | 7/1952 | Swartz et al. | 91/382 |
| 2,962,911 | 12/1960 | Perkey et al. | 91/382 |
| 3,067,628 | 12/1962 | Haworth et al. | 74/471 |
| 4,071,208 | 1/1978 | Baker | 244/221 |
| 4,244,541 | 1/1981 | Dorn | 244/221 |

*Primary Examiner*—Galen L. Barefoot
*Attorney, Agent, or Firm*—Hughes, Barnard & Cassidy

[57] ABSTRACT

A control assembly (50) for deployment of aircraft wing flaps is comprised of an input cam mechanism (54), a feedback cam mechanism (56) and a summing lever member (58) operatively interconnecting the cam mechanisms for mechanically summing independent inputs therefrom to yield a mechanical output signal for actuating flap deployment drives, wherein the input cam mechanism is comprised of a cam (64) rotationally operable in response to a command input signal and a cam follower (68) in mating engagement therewith for cammed movement with rotation thereof to provide a first input signal to the summing lever characteristic of a predetermined flap configuration, the feedback cam mechanism is comprised of a cam (94) rotationally operable in response to movement of the flaps and a cam follower (100) in mating engagement therewith for cammed movement in response to movement of the flaps to provide a second input signal to the summing lever characteristic of the existing flap configuration; and further wherein the summing lever receives the first input signal via a first input leg (160) and the second input signal via a second input leg (162) and provides a mechanical output signal as a sum of the two inputs at a third leg (164) indicative of any difference between the commanded flap configuration and the existing flap configuration.

16 Claims, 6 Drawing Figures

HIGH LIFT SYSTEM CONTROL ASSEMBLY

TECHNICAL FIELD

The present invention relates, generally, to control systems for an airfoil having high lift surfaces moveable with respect thereto and, more especially, to a control-slaved cam assembly receiving an input signal characteristic of a predetermined aerodynamic configuration of the high lift surfaces providing for a driving signal for positioning the same and a feedback signal characteristic of the translating position of the high lift surfaces, wherein the feedback signal is employed to null the signal driving the surfaces. The control system of the present invention is most particularly adapted for positioning and monitoring the flaps and slats of an aircraft wing assembly.

DESCRIPTION OF THE BACKGROUND ART

Airfoils such as an aircraft wing assembly or like primary lift surfaces are customarily provided with secondary airflow modification members moveable with respect thereto in order to tailor lift forces. The most common arrangement as respects the preferred implementation of the present invention is the incorporation of flaps and slats on an aircraft wing moveable with respect thereto in order to control lift forces during landing, takeoff and certain other flight maneuvers. Historically flap and slat positioning has been achieved by various hydro-mechanical linkages. Customarily, the cockpit area is provided with a so-called flap handle which may be manipulated by the pilot between or among several desirable, pre-selected positions corresponding to correlative aerodynamic configurations for these high lift surfaces. The handle and/or its receiving structure typically bears legends or symbols indicative of the range of wing conformations facilitating pilot placement during the course of flight to achieve the desired or necessary airfoil contour. Cables are included intermediate the flap handle and e.g., hydraulic systems for translating movement of the handle into a suitable control signal. In turn, that signal is utilized to impel operation of rotary or linear actuators in communication with the respective flaps and/or slats. The hydro-mechanical linkages downstream of the cable assembly are considered to be reliable positioning devices of very close tolerance respecting the ability to position the associated surface. However, the cable segment of the overall system can be subject to positioning error as a consequence of, e.g., stretch on the input side of the assembly.

The present invention accommodates small, anticipated errors due to mechanical deviations and cable stretch on the input side of the system but isolates the same on the output side in order to achieve enhanced position accuracy. Dual, control-slaved cam assemblies are incorporated to achieve this desirable result. In that regard, the prior art acknowledges various control systems reliant upon plural cam units to achieve desirable control over the positioning of aircraft components.

U.S. Pat. No. 4,071,208 discloses a mechanical mixer for controlling aircraft spoilers and insuring proper positioning of same with various aerodynamic factors borne in mind. That mixer apparatus employs a three-dimensional cam mechanism formed with cam surfaces contoured to position aerodynamic control surfaces, such as spoilers, on the port and starboard wings in response to any combination of first and second pilot-controlled inputs, such as speed-brake and roll inputs respectively. First and second three-dimensional cam surfaces are defined on the cam which is itself moveably mounted on a support for translation along and rotation about a predetermined axis. Cam followers associated with the cams are likewise moveably mounted on the support in a manner permitting separate camming by the two cam surfaces. Port and starboard control surfaces are coupled to the first and second followers, respectively, and are displaced to predetermined positions of deployment in reaction to movement of the followers as determined by the first and second cam surfaces. The cam is translated in response to the first input to vary the profiles of the cam surfaces with which the followers mate when the cam is rotated by the second input. The cam surfaces are contoured such that variation in the profiles cause the positioning of the aerodynamic control surfaces in response to the second pilot-controlled input to be varied in a predetermined manner in response to the first pilot-controlled input.

U.S. Pat. No. 4,244,541 discloses another system where dual cam control is employed for coordinated deployment and retraction of leading and trailing edge wing flaps of an aircraft in response to a single pilot-operated control lever. That patent discloses a system which includes a primary cam member directly responsive to movement of the control lever and a secondary cam member slaved to the actual movement of the trailing edge flaps. The primary cam has dual cam surfaces, including a leading edge cam surface which acts through a leading edge follower to control the leading edge flaps and a correlative arrangement for the trailing edge flaps. The leading and trailing edge follower members in turn operate separate hydraulic subsystems to deploy (i.e., extend or retract) the respective sets of flaps in accordance with pilot-commanded movement of the primary cam. An initial partial displacement of the pilot-operated control lever causes the primary cam and associated follower to effect full deployment of the leading edge flaps, without deploying the trailing edge flaps. Further advancement of the control lever beyond a predetermined point causes the primary cam together with its associated follower to deploy the trailing edge flaps in addition to the previously deployed leading edge flaps. The secondary cam has a cam surface patterned after the trailing edge cam surface of the primary cam means; and as the secondary cam moves in concert with the actual deployment of the trailing edge flaps, a feedback follower cooperates with the trailing edge cam surface on the secondary cam to provide a feedback that is mechanically combined with the response of the trailing edge follower to the primary cam, to control a hydraulic subsystem that moves the trailing edge flaps to the commanded position. The disclosure continues with a specific improvement comprising an override follower cooperating with another cam surface provided on the secondary cam, which is patterned after the leading edge cam surface on the primary cam. Direct control over the deployment of the flaps is overridden when the actual position of the trailing edge flaps dictates a different position of the leading edge flaps than that commanded by the primary cam. Thus, the system accounts for and precludes the possibility of an undesirable flap configuration which might result from inadvertent, premature retraction of the leading edge flaps while the trailing edge flaps remain extended.

As can be seen from the general discussion of certain prior art devices as aforesaid, aircraft lift surfaces, including specifically aircraft wing flaps, have been controlled in the past by cam programming, including certain types of interactive cams for positioning members on the one hand and sensing position on the other. However, apart from such implementation in a conceptual sense, the utilization of cam programming in order to allow a single input (e.g., via the flap handle) to control mechanically the slats and flaps to position their respective high lift surfaces in accordance with separate programs required by aerodynamics of the craft, and monitor that position to yield a nulling control signal, has yet to be realized.

SUMMARY OF THE INVENTION

The present invention advantageously provides an improved high lift control system which efficiently and effectively integrates the related objectives of lift surface control via a single input from, e.g., the flap handle manipulated by the pilot and accurate positioning of those surfaces. The system of the present invention is particularly desirable for its ability to accommodate small errors due to mechanical tolerances and cable stretch, for example, on the input side while isolating them from position accuracy on the output side. A particularly distinct benefit is the ability to provide such precise positioning of high lift surfaces while utilizing a minimum number of parts, thereby reducing weight and cost but not at the sacrifice of reliability.

The foregoing advantages are realized in one aspect of the present invention by providing an aircraft having an airfoil including high lift surfaces—moveable with respect thereto over a predetermined aerodynamic range in response to a remote signal from, e.g., the cockpit, transmitted through linkage and actuator means—with a high lift system control assembly comprising control-slaved input and feedback cam mechanisms and an intermediate bridging member for nulling resolution of mechanical signals therebetween. The input cam assembly is configured to receive a control input characteristic of a predetermined aerodynamic configuration of the high lift surfaces and provide a control signal output proportional thereto for driving those surfaces to a selected one of the potential conformations. The feedback cam assembly is configured to be responsive to the position of the high lift surfaces and develop, in response thereto, a feedback signal proportional to the precise position. The two cam assemblies are bridged by a nulling member which resolves deviation between the desired and actual positions of the high lift surfaces until the two coincide; whereupon the signal output directing movement is interrupted when the precise, desirable configuration has been achieved.

In one implementation of the present invention, the input cam member has a cam contour with a plurality of discrete dwell segments comprising the active camming surfaces, each corresponding to a predetermined one of the potential aerodynamic configurations of the high lift surfaces, and a cam follower in operative engagement therewith for biased deflection upon translation of the cam and development of the control signal output driving actuator means for the high lift surfaces. The feedback cam, driven in response to movement of those surfaces upon actuation, has a corresponding cam contour with a plurality of discrete ramp segments comprising the active camming surfaces position-correlated with the dwell segments of the input cam, and further includes a cam follower in operative engagement therewith for biased deflection upon movement thereof. The nulling member is most preferably a summing lever disposed intermediate and supporting or otherwise secured to the two cam followers. In this highly preferred implementation, the summing lever includes first and second input legs secured to the cam followers and an output leg; whereby compound pivotal motion occurs by initial movement of the input cam and subsequent movement of the feedback cam toward a nulling position. In this structural arrangement, the intrapositional spacing of the discrete dwell segments of the input cam defines an acceptable command input tolerance (i.e., sensitivity to rotational error) for the system, taking into account any deviations potentially encountered on the input side due, e.g., to cable stretch. Likewise, the intrapositional spacing of the discrete ramp segments of the feedback cam defines a position feedback tolerance (i.e., rotational sensivity) dictated by the degree of resolution desired; and, accordingly, the tolerance on the feedback cam is specifically designed to be considerably less than that on the input cam. In a highly preferred embodiment, the dwells of the input cam have a fairly large radius of curvature separated one from another by an advance in the contour; whereas the corresponding ramps on the feedback cam are much shorter in length and have a slope increasing resolution accuracy of the system.

Specific features for improving the reliability and efficiency of the control system of the present invention include biasing means for the cam members to hold the followers against the cam contour, preferably constituting a trapped cam arrangement allowing the inner cam contours to restrain the cam followers in the event of a biasing failure or high load condition. Microadjusting members, preferably comprised of a microadjusting rod with two differing pitch threads, are included to provide precision nulling of the system during rigging.

Other advantages of the present invention, and a fuller appreciation of its construction and mode of operation, will be gained upon an examination of the following detailed description of preferred embodiments, taken in conjunction with the figures of drawing.

DETAILED DESCRIPTION OF THE PREFERRED EMBODIMENTS

The present invention relates, generally, to control systems for high lift surfaces of an airfoil and, more especially, to systems for controlling the positioning of flaps and slats on an aircraft wing (sometimes hereinafter collectively termed "flaps"). Accordingly, the invention will now be described with reference to certain preferred embodiments within the aforementioned context; albeit, those skilled in the art will appreciate that such a description is meant to be exemplary only, and should not be deemed limitative.

Figure 1:
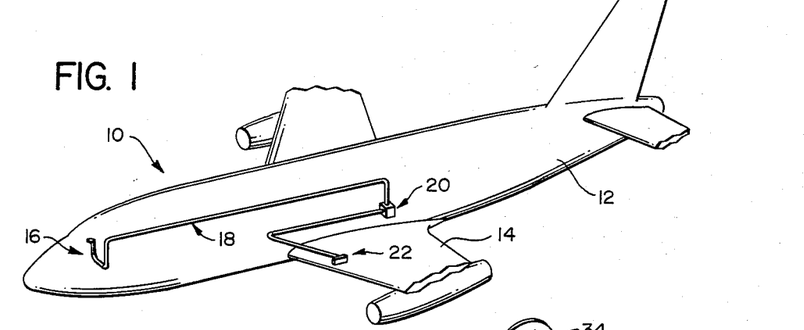
FIG. 1 is an isometric, highly diagrammatic, partially fragmentary view of an aircraft illustrating schematically a system for positioning the high lift surfaces on the wing of the aircraft.

Turning to the figures of drawing, in each of which like parts are identified with like reference characters, FIG. 1 illustrates (and in a highly diagrammatic fashion merely for exemplification) an aircraft designated generally as 10 comprised of a fuselage 12 from which extends primary airfoil means such as wing 14. Wing 14, as is customary, includes inboard leading edge slats, outboard leading edge slats, and trailing edge flaps as discussed below. These high lift surfaces serve to tailor the aerodynamic characteristics of wing 14 to good advantage during takeoff, landing, or certain in-flight maneuvers of the craft 10. Manipulation of these surfaces is achieved and controlled by the pilot via a flap handle designated generally as 16 located within the cockpit. The handle 16 communicates, via cable assemblies designated generally as 18, with a trailing edge flap drive and control unit designated generally as 20 and a leading edge slat drive and control unit designated generally as 22. The control units 20 and 22 respond to input commands from the pilot and position the respective flaps and slats in a desired one of a plurality of predetermined aerodynamic configurations.

Figure 2:
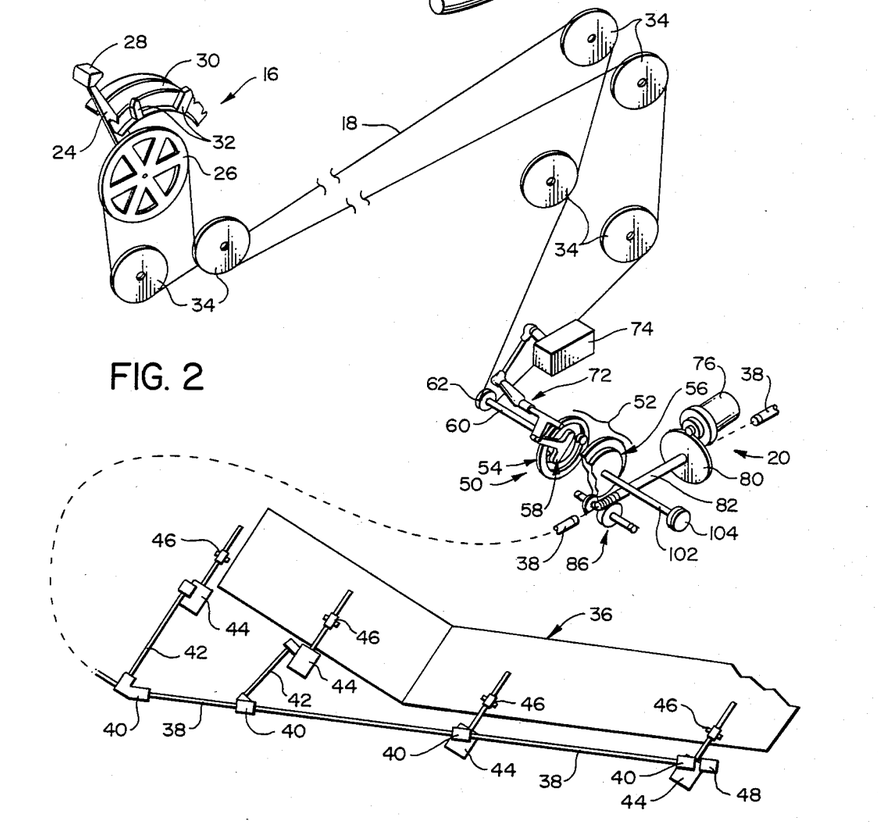
FIG. 2 is an isometric, schematic representation of the control system in accordance with the present invention, shown in its intended environment intermediate the cockpit control and wing structure.

By way of background, and with specific reference to FIG. 2, the flap handle 16 is shown to be comprised of a lever member 24 secured to a wheel 26 to which, in turn, the cable system 18 is itself secured. The lever 24 includes a gripping member 28 for grasping the flap handle and moving it along a generally arcuate path within a guide housing 30. Usually, the handle grip 28 is spring loaded within the lever 24, requiring a positive upward displacement of the former relative to the latter in order to permit movement within the housing and corresponding rotation of wheel 26. Irrespective of that consideration, first and second stop members 32 are provided proximate the path of the lever 24 within housing 30, thereby defining a gate through which the lever must pass to provide spatial discrimination of one setting range versus another over the range of motion of the flap handle. In the exemplary embodiment considered herein, seven discrete aerodynamic configurations are envisioned for selection by the pilot depending upon the wing conformation required by the exigencies of the flight task at hand; ranging from fully up to fully down in intermediate settings at "1", "5", "10", "20", "25" and "30"; and, while those choices are not necessarily arbitrary ones, the same obviously admit of variations as may be required.

In any event, movement of the flap handle 16 along its arcuate path within housing 30 causes coincident rotation of wheel 26 to which the cable 18 is connected. Accordingly, that rotational movement of the wheel is translated to linear displacement of the cable 18 about a series of routing guides 34. Cable motion comprises a command input signal to actuator means, discussed more fully hereinbelow, responsible for deployment of, e.g., the trailing edge flaps designated generally as 36 in FIG. 2. The linkage is achieved through a torque tube 38 in operative communication with the drive for the flaps and the flaps themselves. The torque tube 38 is provided with a plurality of gear box members 40 driving shafts 42 which lead to transmissions 44. A ball screw is associated with each transmission and is secured to the moveable flap means. In capsule sum, a driving output applied to the torque tube 38 is converted by the gear boxes 40 to individual drives transmitted via shafts 42 to transmissions 44. The transmissions, in turn, operate upon ball screws 46 to move the flap either upwardly or downwardly in response to the command signal from the pilot applied via flap handle 16. A position sensor 48 is customarily included to provide a signal indicative of the configuration of the flaps. A control system in accordance with the present invention, designated generally as 50, insures that the configuration achieved is the one selected by the pilot within very close tolerance limits.

Figure 3:
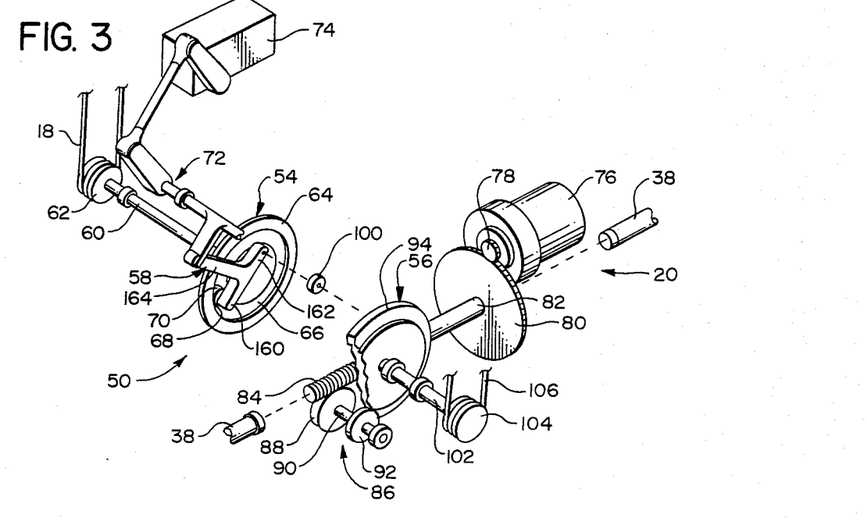
FIG. 3 is an isometric, fragmentary, partially exploded view of a particularly preferred embodiment of a high lift control system in accordance with the present invention.

The control system 50, best viewed in FIGS. 2 and 3, incorporates a control-slaved, dual cam assembly designated generally as 52. The cam assembly 52 is itself comprised of an input cam mechanism designated generally as 54, a feedback cam mechanism designated generally as 56, and a nulling bridge member designated generally as 58. A control input from cable 18 is applied to the input cam means 54 via an input shaft member 60 journalled for rotation intermediate an input pulley 62 and the rotational center of a cam member 64 of the input cam mechanism 54. The input cam mechanism 54 is most preferably designed with a trapped one configuration, thereby including a cam contour 66 as best viewed in FIG. 5 and considered in detail below. The input cam mechanism 54 further includes a cam follower 68 comprised of a roller 70 disposed within the internal dimension of the contour 66. The cam follower 68 is secured to the nulling bridge member 58 such that rotational motion imparted to the cam member 64 upon manipulation of the cable assembly 18 is translated to pivotal motion in a linkage arm assembly 72. The linkage arm assembly 72 includes a valve input crank communicating with an hydraulic control valve 74. The control valve 74 in turn operates an hydraulic motor 76 which terminates in a geared shaft 78. The output of the motor 76 is applied to an output gear 80 secured to a drive shaft 82. The output end of shaft 82 drives torque tube 38 and includes, as well, a worm gear 84 which drives a gear train designated generally as 86. The gear train is comprised of a first gear 88 mating with the worm gear 84 and driving a shaft 90 to which is attached a second gear 92. The gear 92, in turn, mates with and drives the feedback cam mechanism 56; itself comprised of a cam member 94 having a peripheral gear 96 formed circumferentially thereabout as best viewed in FIG. 6. Like cam member 64, the cam 94 is preferably designed in a trapped cam configuration including a cam contour 98 within which is disposed a cam follower comprised of a roller 100 secured to the nulling bridge member 58. A shaft 102 extends from the face of cam 94 for coincident rotation therewith upon drive rotation of the worm gear 84 (transmitted through gear train 86). The shaft 102 terminates in a pulley 104 having an output 106 to the leading edge slat assembly (not shown).

Considering the overall control system 50 in a very broad sense, the same may be viewed to have an input portion receiving a command from the pilot, a drive portion responsive to that input, and a feedback portion monitoring ultimate movement of the high lift surfaces during their deployment. The input command from cable members 18 causes rotational translation of the input cam mechanism 54 and, more particularly, the cam member 64. Because of the trapped cam contour 66, the input cam follower 68 is caused to translate that motion into pivotal movement applied to the control valve 74 via the input crank of linkage 72. Subsequently, the control valve causes the hydraulic motor 76 to rotate clockwise or counterclockwise as may be required to extend or retract the high lift surface; that motion translating through the output gear 80 and worm 88. The trailing edge flaps are driven directly by connection of the torque tubes 38 to worm 88, while the leading edge slats are controlled somewhat indirectly through the gear train linkage 86 and feedback cam mechanism 56. The latter, and specifically the cam member 94 thereof, is in direct-drive relationship with respect to the output and thereby provides a monitor on the actual position of the high lift surfaces (e.g., flap 36). Operationally, the two cam mechanisms 54 and 56 cooperating through the nulling bridge 58 serve to create a control output signal actuating valve 74 and thence null that signal, respectively, as described immediately below.

Figure 5:
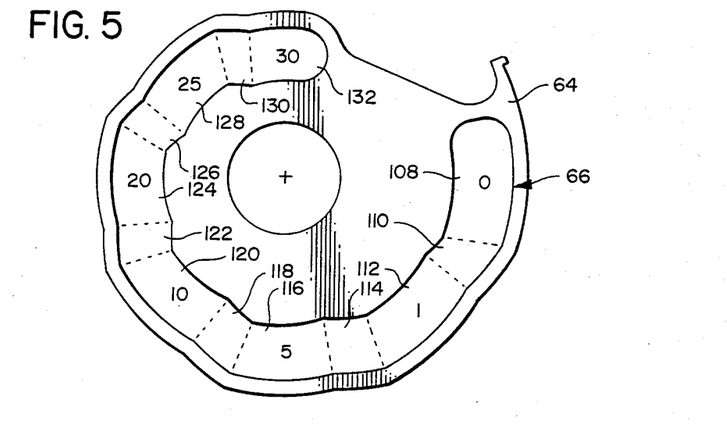
FIG. 5 is a side elevational view of the cam contour in a preferred structural embodiment for the input cam of the high lift control system of the present invention; and, FIG. 6 is a side elevational view, similar to FIG. 5, but showing a highly preferred cam contour for the feedback cam of the instant system.
Figure 6:
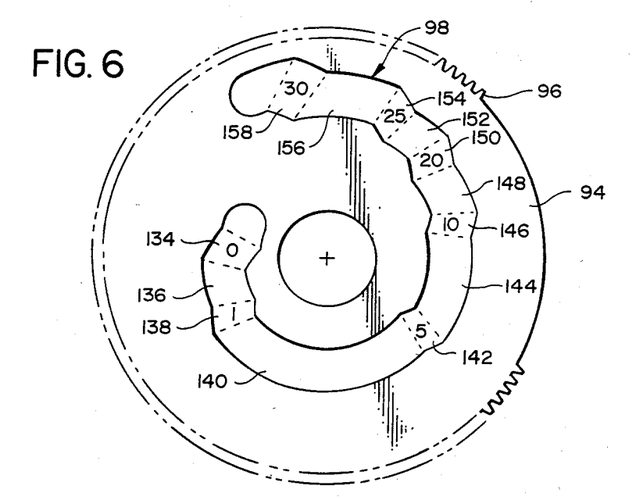

FIGS. 5 and 6 illustrate highly preferred cam geometries for each of the input cam 64 and feedback cam 94, respectively constituting the rotary cam elements of the input cam mechanism 54 and feedback cam mechanism 56. As indicated generally above, the lift surface configurations may be deemed representative of a conventional system wherein a plurality of aerodynamic configurations are defined by positions "0", "1", "5", "10", "20", "25" and "30". As can be seen with reference to the profiles of the cam contours shown in FIGS. 5 and 6, each cam includes an active segment or active camming surface corresponding to each of the noted predetermined configurations for the lift surfaces separated by advance segments. More particularly, the cam contour 66 of FIG. 5 includes a dwell region 108 for the "0" position (i.e., up position); an advance 110 merging to a dwell 112 for the "1" position; an advance 114 merging to a dwell 116 for the "5" position; an advance 118 merging to a dwell 120 for the "10" position; an advance 122 merging to a dwell 124 for the "20" position; an advance 126 merging to a dwell 128 for the "25" position; and, an advance 130 merging to a dwell 132 for the "30" position—in this case, each dwell comprising the active camming surface for controlling flap/slat position in response to an input signal impelling cam rotation. In an analagous way, the contour 98 of feedback cam includes a plurality of discrete ramp segments corresponding to the respective flap/slat configurations, in this case commencing with a ramp 134 for the "0" position; an advance 136 merging to a ramp 138 for the "1" position; an advance 140 merging to a ramp 142 for the "5" position; an advance 144 merging to a ramp 146 for the "10" position; an advance 148 merging to a ramp 150 for the "20" position; an advance 152 merging to a ramp 154 for the "25" position; and, an advance 156 merging to a ramp 158 for the "30" position—in this case, each ramp comprising the active camming surface sensitive to flap/slat position while the advances here are technically dwells, albeit nonactive camming surfaces in this instance. The cooperative interrelationship between the two cam contours 66 and 98, in conjunction with the geometry of the nulling bridge member 58, serves to provide very accurate positioning of the high lift surfaces while accommodating somewhat greater tolerances on the input side of the system.

As is fairly apparent from a comparison of the cam geometries shown in FIGS. 5 and 6, the dwell regions (i.e., residence length) in the former tend to be considerably broader than the ramp regions in the latter with a fairly large radius of curvature. Contrariwise, the respective ramps in the feedback cam are considerably shorter (in terms of residence length) as respects the corresponding dwell in the cam contour 66; while a fairly steep slope is impressed in the ramp geometry for the feedback contour 98 making the cam follower 100 more responsive to even slight rotational movement of the cam 94 within a given ramp segment. The nulling bridge member 58 resolves the dimensional differences which result from initial command motion of the input cam—responsible for actuation of lift surface movement—and subsequent, corresponding rotation of the feedback cam during the commanded sequence, to provide a regulated control signal for the surface actuators. Most preferably, this nulling bridge member 58 is a summing lever designed for compound pivotal movement to provide a single output in response to spatial differences in independent plural inputs.

Looking more specifically to the exemplified embodiment of FIG. 3, the nulling bridge member 58 is shown there as a three point summing lever in the general form of a "T" having a first leg 160 supporting or otherwise secured to the cam follower roller 70, a second leg 162 likewise secured to or otherwise supporting the cam follower roller 100, and a third leg 164 in operative engagement with the linkage arm assembly 72. The first and second legs 160 and 162 comprise input legs while the third leg 164 constitutes an output leg whose motion is the mechanical sum of the inputs on the former two legs. This summing feature is achieved by alternate pivotal motion of the output leg in response to deflection of one input leg as a consequence of cam rotation about a pivot provided by the other input leg. (At this juncture, it is noteworthy to remark in general that the principal movement of the lever is pivotal, but accompanied by slight concomitant translation of the input leg serving as the pivot point. Hence, as used herein, the term "pivot point" within this context will expressly or implicitly take into account the slight dynamic translation of the affected arm.) Cam geometries are designed to provide a null configuration when each cam follower is disposed within a respective control segment corresponding to the same flap setting (e.g., roller 70 in dwell 108 and roller 100 on ramp 134). Otherwise, a pivotal imbalance results proportional to the spatial deviation between cam followers which is resolved as a summing output from the lever controlling actuation of the drive for reestablishing the null configuration. This aspect of the invention is best envisioned with reference to an operational example of the assembly 50.

By way of such an operational example, let it be assumed that the aircraft 10 has its flaps and slats in the up position, corresponding to the "0" positions of FIGS. 5 and 6. Accordingly, the roller 70 of the cam follower for the input cam mechanism 54 will be disposed within the dwell 108 and the roller 100 associated with the feedback cam assembly 56 will be on the ramp 134. The output arm 164 of the summing lever 58 will likewise be disposed at this "0" position with the valve 74 closed (i.e., the summing lever is in a null configuration). Let it now be assumed that the pilot desires to achieve a configuration for the high lift surfaces corresponding to the position "20", and therefore moves the flap handle 16 to the corresponding position within the cockpit and causes translation of the cable 18. That translation will be coupled to the cam member 64 rotating the same and causing the roller 70 to be deflected by the changing cam contour 66, presenting it within the dwell region 124. Because the spatial disposition of the contour 66 vis-a-vis the rotational center of cam 64 presents dwell 124 closer than dwell 108 thereto, this rotational movement will cause deflection of the input arm 160 and corresponding pivotal movement of the output arm 164 about a pivot point provided by the linkage of input arm 162 to the cam 94 (with slight, generally simultaneous translation of the pivot about arm 162). That movement will generate a control output signal applied to the valve 74 via the crank of linkage 72. In succession, the valve 74 will operate hydraulic motor 76 creating an output on shaft 82 driving the lift surfaces via the torque tubes 38 and output 106 through the worm gear 84 and gear train 86. Concomitantly (with system delay taken into account), the cam 94 will be caused to rotate due to the driving connection through the gear train, in response to which the roller 100 will traverse the moving cam contour 98 causing predominantly radial deflection from its initial position at ramp 134 as the cam contour proceeds toward the ramp 150 associated with the desired "20" position. Deflection of the feedback cam follower in this manner causes pivotal motion of the output leg 164 of the summing lever about a (slightly translating) pivot point now provided by cam follower 68, but in a direction counter to that initially developed by translation of the roller 70 within contour 66. As the cam contour 98 begins to present roller 100 on the ramp 150, the output arm 164 reduces the magnitude of the output signal in a stepwise fashion (as each intermediate ramp and advance passes) until the roller 100 resides at the narrow ramp area 150. At that time, the output is returned to a null position with respect to the valve 74 which now closes and terminates the output of motor 76, awaiting a subsequent command.

Positional accuracy of the surfaces controlled by assembly 50 is enhanced by the narrow, sloping geometry of the ramp comprising the cam contour 98, while certain dimensional instabilities are accommodated by the rather expansive dwell segments comprising the cam contour 66. In other words, the disposition of roller 70, e.g., within dwell 124 may vary rather widely in commanding the system to deploy the, e.g., flaps to the related aerodynamic position; the cam geometry being relatively insensitive to rotational error within each active camming segment. On the contrary, as those flaps deploy and cause the roller 100 to begin contact with the related ramp 150, very minute positional changes have demonstrably manifest nulling consequences; the cam geometry being comparatively quite sensitive to any rotational error within each active camming segment. The precise dimensional tolerances (i.e., rotational sensitivities) are, furthermore, readily tailored both in the amount of variation allowed by input cam mechanism 54 and that permitted by feedback cam mechanism 56 as may be required or desired by the system designer.

Figure 4:
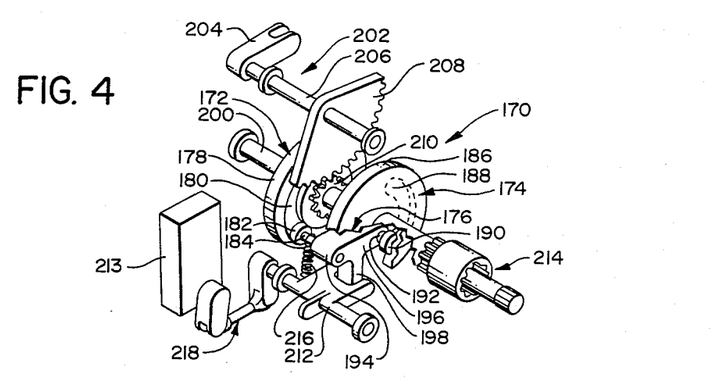
FIG. 4 is a view, similar to FIG. 3, but showing an alternate embodiment.

Certain other features augment the positional control of the assembly 50 to enhance both its operational efficiencies and reliability in service. Turning to FIG. 4, an alternate embodiment of the control system, designated here generally as 170, is shown to include these features. The control system 170 is comprised of the same dual cam arrangement for creating a control signal to cause deployment of the high lift surfaces on the one hand and to develop a feedback signal for nulling the control signal on the other hand. Accordingly, the assembly includes an input cam mechanism designated generally as 172, a feedback cam mechanism designated generally as 174 and a bridging member designated generally as 176, again in the form of a three-point summing lever. The input cam mechanism 172 is constituted of a cam member 178 including a cam contour 180 within which is disposed a roller 182 associated with an input cam follower 184. Likewise, feedback cam mechanism 174 is comprised of a cam member 186 having a cam contour 188 receiving a roller 190 associated with a feedback cam follower 192. The summing lever 176 is again in the general form of a "T", having a first leg 194 secured to the input cam follower 184, a second leg 196 secured to the feedback cam follower 192 and a third leg 198 constituting the output leg.

The cam 178 is journalled for rotation about a shaft 200 in response to a mechanical input via a drive linkage 202. In the embodiment shown in FIG. 4, the linkage 202 is comprised of a crank fitting 204 in operative communication with the flap handle in the cockpit, a shaft 206 which rotates in response to pivotal motion of fitting 204, and a gear quadrant 208 secured to that shaft. A gear 210 is secured to the shaft 200 and mates with the gear quadrant 208, whereby an input via fitting 204 causes arcuate motion of the quadrant 208 which is translated into rotational displacement of shaft 200 and, hence, the input cam 178. Rotation of cam 178 causes a corresponding displacement of its associated cam follower 184 and consequent pivotal movement of the summing lever 176 about cam follower 192 which serves as a pivot point. That pivotal movement creates a displacement of the output arm 198 which provides an output control signal felt at a valve input crank 212 which is in operative engagement with the hydraulic valve 213 controlling the motor responsible for deployment of the high lift surfaces (not shown). As the surfaces deploy to a different, commanded configuration, that movement is coupled to the cam 186 via an interface with the power drive unit gearbox, designated generally as 214. In the illustrated embodiment, the interface includes a shaft extending from the rotational center of cam 186, splined to insure that incremental movement of the lift surface is coupled directly to the cam. Movement of cam 186 results in corresponding displacement of its associated cam follower 192; resulting again in pivotal movement of the summing lever 176, but now against the pivot supplied by cam follower 184. This pivotal movement, as was the case in respect of the embodiment of FIG. 3, is counter to that initially created via cam assembly 172 (and again is accompanied by slight translation). Hence, once the high lift surfaces achieve the commanded position, the output leg 194 returns to a null position terminating the command signal to the actuator system for the lift surfaces.

The embodiment of FIG. 4 is the functional equivalent of that shown in FIG. 3. Additionally, two specific features are incorporated in this latter embodiment not shown in FIG. 3 simply for the sake of clarity in the illustration. More particularly, the dual cam assembly is provided with biasing means 216, here shown in the form of a biasing spring. The biasing thereby provided insures positive cooperation of the cam followers within the respective cam contours for enhanced positional accuracy. The biasing spring 216 preloads the cam followers against the outer contours of the trapped cams to eliminate lost motion with normal operating loads. However, should a high load condition occur or even should the spring experience failure, the inner contours of the cams will nonetheless restrain the cam followers, providing a desirable element of redundancy. The embodiment of FIG. 4 further includes a microadjusting member designated generally as 218 to facilitate rigging. Most preferably, the microadjusting member is comprised of a microadjusting rod having two differing pitch threads which allow precision nulling of the hydraulic valve 213 for rigging. Although these additional features (i.e., biasing and microadjust) are illustrated only with reference to the embodiment of FIG. 4, the same may be (and preferably are) incorporated within the embodiment of FIG. 3 should it be elected; having been omitted from the illustration simply for clarity sake.

In either of the exemplified embodiments, the control system of the present invention is extremely efficient and reliable in use. Relatively expansive dwells in the input cam member tolerate rather wide variance in the precise positioning of the input drive command for the high lift surfaces, accommodating deviations from precision as is expected in conventional systems due, e.g., to cable stretch. However, while broader tolerance ranges (in the sense of rotational sensitivity) on the input side are allowed, extremely precise positioning of the surfaces is achieved by virtue of the direct drive of the feedback cam and its narrow and precisely shaped corresponding ramp segments. Allowable ranges of tolerances/sensitivites on both side of the assembly are readily tailored simply by appropriate cam contouring; more importantly as respects the feedback side where the slope of the cam ramp for each position dictates in large measure the point at which nulling occurs. Nulling is achieved through the summing lever which provides a single output proportional to the combined, independent inputs from the two cam mechanisms; all in response to a single pilot command transmitted through the flap handle. And yet, these improvements are achieved with the elegant simplicity of cooperative cam mechanisms and a bridging summing lever, thereby further enhancing the utility of the instant system within the context of its intended aircraft application as size and weight of the device are minimized.

While the invention has now been described with reference to certain preferred embodiments, those skilled in the art will appreciate that various substitutions, changes, modifications and omissions may be made without departing from the spirit thereof. Accordingly, it is intended that the foregoing description be considered merely exemplary and not be deemed as a restriction on the scope of the claims granted herein.

We claim:

1. In an aircraft having an airfoil including high lift surfaces moveable with respect thereto over a predetermined aerodynamic range of airfoil configurations in response to a command signal transmitted through linkage and actuator means, the improvement characterized by a high lift system control assembly in cooperative engagement with said linkage and actuator means, comprising control-slaved input and feedback cam assemblies each including a cam member with a cam contour and a cam follower disposed in mating engagement with said contour for camming deflection upon cam rotation, and summing lever means having first and second input legs associated respectively with the input cam follower and feedback cam follower and a third output leg disposed for compound pivotal motion upon camming deflection of said cam followers for mechanical summing of inputs to said first and second legs; wherein each of said cam contours is comprised of a plurality of discrete active cam segments, each corresponding to one of a plurality of airfoil configurations and each of said cam members is disposed for rotational displacement to present the respective cam follower in the cam segment corresponding to the commanded configuration; said summing lever being initially pivoted upon rotational displacement of said input cam member and associated deflection of said input cam follower at a pivot about said feedback cam follower to develop said drive control signal and being subsequently pivoted upon rotational displacement of said feedback cam member and associated deflection of said feedback cam follower at a pivot about said input cam follower to null said drive control signal upon coincident presence of said input cam follower and said feedback cam follower in the respective discrete cam segments corresponding to the commanded airfoil configuration.

2. The high lift system control assembly of claim 1, wherein the intrapositional geometry of each of said discrete cam segments of said input cam contour defines a command input sensitivity to rotational error and the intrapositional geometry of each of said discrete cam segments of said feedback cam contour defines a position feedback sensitivity to rotational error, and further wherein said position feedback sensitivity is less than said command input sensitivity.

3. The high lift system control assembly of claim 2, wherein each of said discrete cam segments has a residence length and a contour slope; and further wherein said residence length for each of said segments of said input cam contour is greater than the length of the corresponding segment of said feedback cam contour and said contour slope for each of said segments of said input cam contour is lesser than the slope of the corresponding segment of said feedback cam contour.

4. The high lift control system of claim 3, wherein said active cam segments for said input cam contour are comprised of dwell segments separated by advance segments and said active cam segments for said feedback cam contour are comprised of ramp segments separated by nonactive dwell segments.

5. The high lift system control assembly of claim 2, wherein said input and feedback cam assemblies are trapped cam assemblies each having inner and outer cam contours.

6. The high lift system control assembly of claim 5, further comprising biasing means for preloading said cam followers against the outer contours of the respective cam members.

7. The high lift system control assembly of claim 6, further comprising adjustment means intermediate said summing lever and said actuator means for rigging said control assembly to a static, null configuraton.

8. A control assembly for deployment of aircraft wing flaps, comprising an input cam mechanism, a feedback cam mechanism and a summing lever means operatively interconnecting said cam mechanisms for mechanically summing independent inputs therefrom to yield a mechanical output signal for actuating flap deployment means, wherein said input cam mechanism is comprised of a cam rotationally operable in response to a command input signal and a cam follower in mating engagement therewith for deflecting movement with rotation thereof to provide a first input signal to said summing lever characteristic of a predetermined flap configuration, and said feedback cam mechanism is comprised of a cam rotationally operable in response to movement of said flaps and a cam follower in mating engagement therewith for deflecting movement with movement of said flaps to provide a second input signal to said summing lever characteristic of the existing flap configuration; wherein said summing lever provides said mechanical output signal as a sum of said input signals when said commanded flap configuration differs from said existing flap configuration; and further wherein each of said cams includes a cam contour comprised of a plurality of discrete active cam segments, each corresponding to one of a plurality of flap configurations, and each of said cam members is disposed for rotational displacement to present the respective cam follower in the cam segment corresponding to the commanded configuration, said summing lever being initially pivoted upon rotational displacement of said input cam member and associated deflection of said input cam follower at a pivot about said feedback cam follower to develop said mechanical output signal and being subsequently pivoted upon rotational displacement of said feedback cam member and associated deflection of said feedback cam follower at a pivot about said input cam follower to null said mechanical output signal upon coincident presence of said input cam follower and said feedback cam follower in the respective discrete cam segments corresponding to the commanded airfoil configuration.

9. The control assembly of claim 8, wherein the intrapositional geometry of each of said discrete cam segments of said input cam contour defines a command input sensitivity to rotational error and the intrapositional geometry of each of said cam dwell segments of said feedback cam contour defines a position feedback sensitivity to rotational error, and further wherein said position feedback sensitivity is less than said command input sensitivity.

10. The control assembly of claim 9, wherein each of said discrete cam segments has a residence length and a contour slope; and further wherein said residence length for each of said segments of said input cam contour is greater than the length of the corresponding segment of said feedback cam contour and said contour slope for each of said segments of said input cam contour is lesser than the slope of the corresponding segment of said feedback cam contour.

11. The control assembly of claim 10, wherein said active cam segments for said input cam contour are comprised of dwell segments separated by advance segments and said active cam segments for said feedback cam contour are comprised of ramp segments separated by nonactive dwell segments.

12. The control assembly of claim 9, wherein said input and feedback cam assemblies are trapped cam assemblies, each having inner and outer cam contours.

13. The control assembly of claim 12, further comprising biasing means for preloading said cam followers against the outer contours of the respective cam members.

14. The control assembly of claim 13, further comprising adjustment means intermediate said summing lever and said actuator means for rigging said control assembly to a static, null configuration.

15. In an aircraft having an airfoil including high lift surfaces moveable with respect thereto over a predetermined aerodynamic range of airfoil configurations in response to a command signal transmitted through linkage and actuator means, the improvement characterized by a high lift system control assembly in cooperative engagement with said linkage and actuator means, comprising control-slaved input and feedback cam assemblies each including a cam member with a cam contour and a cam follower disposed in mating engagement with said contour for camming deflection upon cam rotation, and summing lever means having first and second input legs associated respectively with the input cam follower and feedback cam follower and a third output leg disposed for compound pivotal motion upon camming deflection of said cam followers for mechanical summing of inputs to said first and second legs, said input and output legs comprising an integral summing lever means; wherein said input cam assembly receives said command signal and is displaced along a cam path proportional thereto to pivot said summing lever and create a drive control signal operating said actuator means, and said feedback cam assembly is slaved for displacement with movement of said high lift surfaces to pivot said summing lever to null said drive control signal upon positioning of said high lift surfaces at the commanded airfoil configuration.

16. A control assembly for deployment of aircraft wing flaps, comprising an input cam mechanism, a feedback cam mechanism and a summing lever means operatively interconnecting said cam mechanisms for mechanically summing independent inputs therefrom to yield a mechanical output signal for actuating flap deployment means, wherein said input cam mechanism is comprised of a cam rotationally operable in response to a command input signal and a cam follower in mating engagement therewith for deflecting movement with rotation thereof to provide a first input signal to a first input leg of said summing lever characteristic of a predetermined flap configuration, and said feedback cam mechanism is comprised of a cam rotationally operable in response to movement of said flaps and a cam follower in mating engagement therewith for deflecting movement with movement of said flaps to provided a second input signal to a second input leg of said summing lever characteristic of the existing flap configuration; wherein said summing lever provides said mechanical output signal at an output leg disposed at a common point with said input legs, which output signal is derived as a sum of said input signals when said commanded flap configuration differs from said existing flap configuration.

* * * * *